United States Patent
Anderson et al.

(10) Patent No.: US 9,641,392 B2
(45) Date of Patent: *May 2, 2017

(54) POLICY IMPLEMENTATION IN A NETWORKED COMPUTING ENVIRONMENT

(71) Applicant: International Business Machines Corporation, Armonk, NY (US)

(72) Inventors: Jason L. Anderson, San Jose, CA (US); Gregory J. Boss, Saginaw, MI (US); Jeffrey L. Coveyduc, San Jose, CA (US); Shaun T. Murakami, San Jose, CA (US); John Reif, Menlo Park, CA (US); Animesh Singh, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/705,170

(22) Filed: May 6, 2015

(65) Prior Publication Data

US 2015/0236917 A1 Aug. 20, 2015

Related U.S. Application Data

(63) Continuation of application No. 13/429,774, filed on Mar. 26, 2012, now Pat. No. 9,088,570.

(51) Int. Cl.
*G06F 15/173* (2006.01)
*H04L 12/24* (2006.01)
*H04L 29/08* (2006.01)

(52) U.S. Cl.
CPC .......... *H04L 41/0893* (2013.01); *H04L 67/10* (2013.01)

(58) Field of Classification Search
CPC ........ G06F 17/30082; G06F 8/60; G06F 8/70; G06F 9/5088; G06F 9/45558;
(Continued)

(56) References Cited

U.S. PATENT DOCUMENTS 6,484,261 B1 * 11/2002 Wiegel ............... H04L 41/0856
715/763
7,835,285 B2 11/2010 Ayyagari et al.
(Continued)

FOREIGN PATENT DOCUMENTS

| CN | 102185928 A | 9/2011 |
|---|---|---|
| CN | 102202049 A | 9/2011 |
| CN | 102291280 | 12/2011 |

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.
(Continued)

*Primary Examiner* — Dustin Nguyen
*Assistant Examiner* — Hao Nguyen
(74) *Attorney, Agent, or Firm* — William H. Hartwell; Maxine L. Barasch; Keohane & D'Alessandro PLLC

(57) ABSTRACT

Embodiments of the present invention relate to an approach for resolving and/or implementing policies based on layers of a network stack (e.g., cloud computing stack). Specifically, for a given policy that is being resolved, the system first evaluates the applicability of the policy to each layer in the network stack. For a given policy, the system then evaluates the relative effectiveness of applying the policy to achieve the overall goal of the policy. Based on the best fit evaluation of the relative comparison, the system then decides how and where the policy is enacted (e.g., determines a protocol for implementing the policy).

20 Claims, 6 Drawing Sheets

(58) Field of Classification Search
CPC ....... G06F 2009/4557; G06F 17/30289; G06F 2009/45587; G06F 2009/45595; G06F 8/20; H04L 67/10; H04L 41/0893; H04L 63/20; H04L 41/28; H04L 67/2852; H04L 41/12
USPC ..... 709/201, 203, 223, 224, 226; 718/1, 100
See application file for complete search history.

(56) References Cited

U.S. PATENT DOCUMENTS

| | | | |
|---|---|---|---|
| 8,689,282 B1* | 4/2014 | Oprea | H04L 63/20 726/1 |
| 2008/0184336 A1* | 7/2008 | Sarukkai | G06F 21/6218 726/1 |
| 2010/0005505 A1* | 1/2010 | Gottimukkala | H04L 41/082 726/1 |
| 2010/0319004 A1 | 12/2010 | Hudson et al. | |
| 2010/0332630 A1* | 12/2010 | Harlow | H04L 12/2697 709/221 |
| 2011/9922642 | 1/2011 | DeMilo et al. | |
| 2011/0113142 A1 | 5/2011 | Rangegowda et al. | |
| 2011/0153824 A1 | 6/2011 | Chikando et al. | |
| 2011/0231899 A1 | 9/2011 | Pulier et al. | |
| 2011/0252420 A1 | 10/2011 | Tung et al. | |
| 2011/0265168 A1 | 10/2011 | Lucovsky et al. | |
| 2012/0011077 A1 | 1/2012 | Bhagat | |
| 2012/0066020 A1 | 3/2012 | Moon et al. | |
| 2012/0185913 A1 | 7/2012 | Martinez et al. | |
| 2012/0246317 A1* | 9/2012 | Eriksson | G06F 9/5072 709/226 |
| 2013/0111349 A1* | 5/2013 | Yan | G06F 9/5072 715/738 |
| 2013/0232185 A1* | 9/2013 | Armour | G06F 9/5072 709/203 |
| 2013/0346360 A1* | 12/2013 | Liu | G06F 17/30289 707/609 |
| 2014/0068075 A1* | 3/2014 | Bonilla | H04L 41/0823 709/226 |
| 2014/0149983 A1* | 5/2014 | Bonilla | G06F 9/45558 718/1 |

OTHER PUBLICATIONS

Mell et al., "The NIST Definition of Cloud Computing", National Institute of Standards and Technology, Information Technology Laboratory, Version 15, Oct. 7, 2009, 2 pages.
Winans, T. et al., "Cloud computing: A collection of working papers", Deloitte (2009), 33 pages.
U.S. Appl. No. 13/429,774, Office Action, Feb. 20, 2014, 44 pages.
U.S. Appl. No. 13/429,774, Final Office Action, Jun. 25, 2014, 37 pages.
U.S. Appl. No. 13/429,774, Office Action, Nov. 7, 2014, 45 pages.
U.S. Appl. No. 13/429,774, Notice of Allowance, Mar. 11, 2015, 34 pages.
Xiao Qi Zhi, "Information Materials for IDS", Date of CN Office Action Sep. 22, 2015, 4 pages.
Xiao Qi Zhi, "Information Materials for IDS", CN Office Action Dated Apr. 11, 2016, 4 pages.

* cited by examiner

POLICY IMPLEMENTATION IN A NETWORKED COMPUTING ENVIRONMENT

The present patent document is a continuation of U.S. patent application Ser. No. 13/429,774, filed Mar. 26, 2012, entitled "POLICY IMPLEMENTATION IN A NETWORKED COMPUTING ENVIRONMENT", the disclosure of which is incorporated herein by reference.

TECHNICAL FIELD

In general, embodiments of the present invention relate to policy implementation. Specifically, embodiments of the present invention relate to the evaluation and implementation of policies against network stack layers in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Policies and standards may be important to various types of cloud-based implementations such as healthcare standards, financial regulations, etc. Challenges may exist, however, in that cloud environments may not have a sufficiently practical approach for implementing and/or maintaining these policies. Without such an approach, policies may be inconsistently and/or incorrectly applied across the computing environment.

SUMMARY

In general, embodiments of the present invention relate to an approach for resolving and/or implementing policies based on layers of a network stack (e.g., cloud computing stack). Specifically, for a given policy that is being resolved, the system evaluates the applicability of the policy to each layer in the network stack. For a given policy, the system then evaluates (e.g., compares) the relative effectiveness of applying the policy in achieving an overall goal of the policy. Based on a "best fit" evaluation of the relative comparison, the system then decides how and where the policy is enacted (e.g., determines a protocol/plan for implementing the policy).

A first aspect of the present invention provides a computer-implemented method for implementing policies in a networked computing environment, comprising: evaluating an applicability of a policy to a set of layers of a network stack in the networked computing environment, the policy being drawn from a set of policies stored in at least one computer storage device; determining an effectiveness of the policy as applied to the set of layers; and determining, based on the effectiveness, a protocol for implementing the policy for at least one of the set of layers.

A second aspect of the present invention provides a system for implementing policies in a networked computing environment, comprising: a memory medium comprising instructions; a bus coupled to the memory medium; and a processor coupled to the bus that when executing the instructions causes the system to: evaluate an applicability of a policy to a set of layers of a network stack in the networked computing environment, the policy being drawn from a set of policies stored in at least one computer storage device; determine an effectiveness of the policy as applied to the set of layers; and determine, based on the effectiveness, a protocol for implementing the policy for at least one of the set of layers.

A third aspect of the present invention provides a computer program product for implementing policies in a networked computing environment, the computer program product comprising a computer readable storage media, and program instructions stored on the computer readable storage media, to: evaluate an applicability of a policy to a set of layers of a network stack in the networked computing environment, the policy being drawn from a set of policies stored in at least one computer storage device; determine an effectiveness of the policy as applied to the set of layers; and determine, based on the effectiveness, a protocol for implementing the policy for at least one of the set of layers.

A fourth aspect of the present invention provides a method for deploying a system for implementing policies in a networked computing environment, comprising: providing computer infrastructure being operable to: evaluate an applicability of a policy to a set of layers of a network stack in the networked computing environment, the policy being drawn from a set of policies stored in at least one computer storage device; determine an effectiveness of the policy as applied to the set of layers; and determine, based on the effectiveness, a protocol for implementing the policy for at least one of the set of layers.

BRIEF DESCRIPTION OF THE DRAWINGS

These and other features of this invention will be more readily understood from the following detailed description of the various aspects of the invention taken in conjunction with the accompanying drawings in which.

Figure 1:
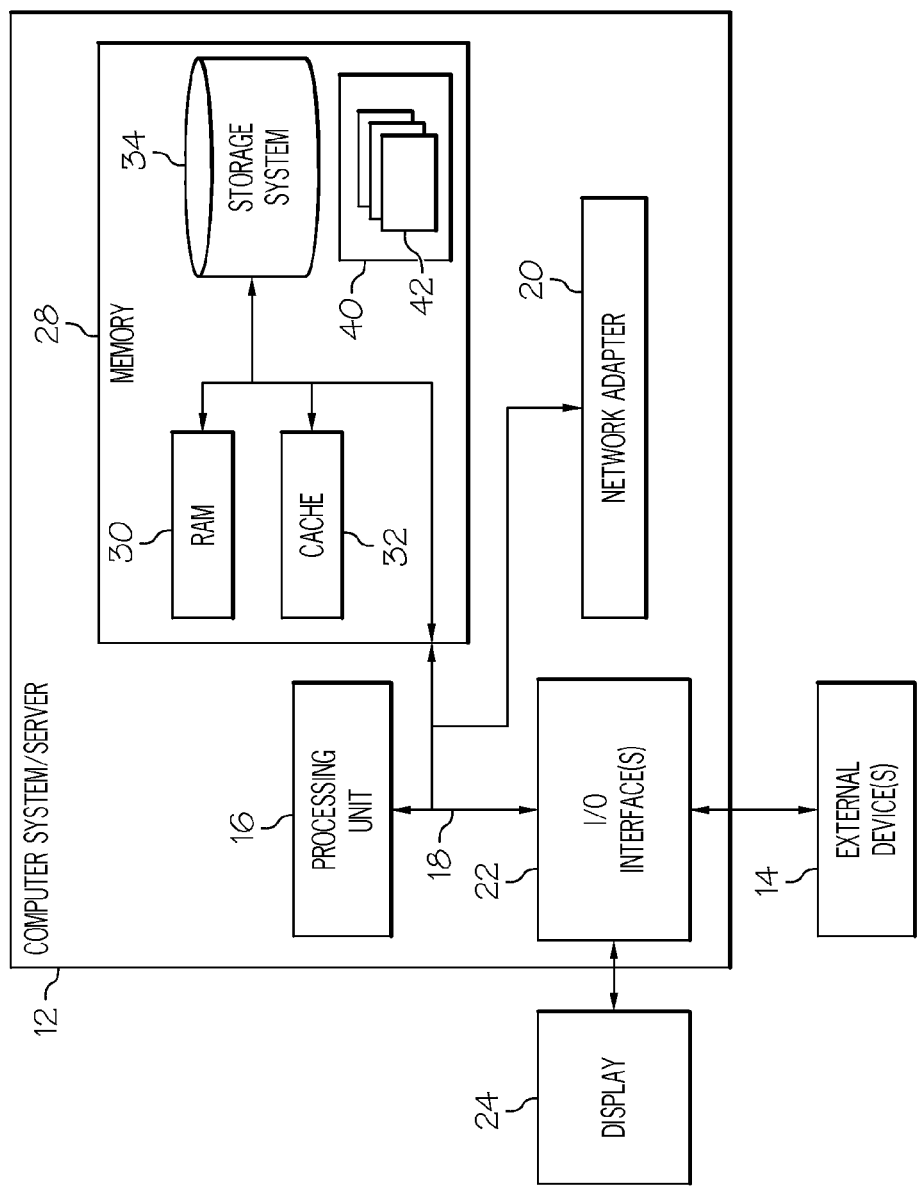
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which embodiments are shown. This disclosure may, however, be embodied in many different forms and should not be construed as limited to the embodiments set forth herein.

Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention relate to an approach for resolving and/or implementing policies based on layers of a network stack (e.g., cloud computing stack). Specifically, for a given policy that is being resolved, the system evaluates the applicability of the policy to each layer in the network stack. For a given policy, the system then evaluates (e.g., compares) the relative effectiveness of applying the policy in achieving an overall goal of the policy. Based on a "best fit" evaluation of the relative comparison, the system then decides how and where the policy is enacted (e.g., determines a plan/protocol for implementing the policy).

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
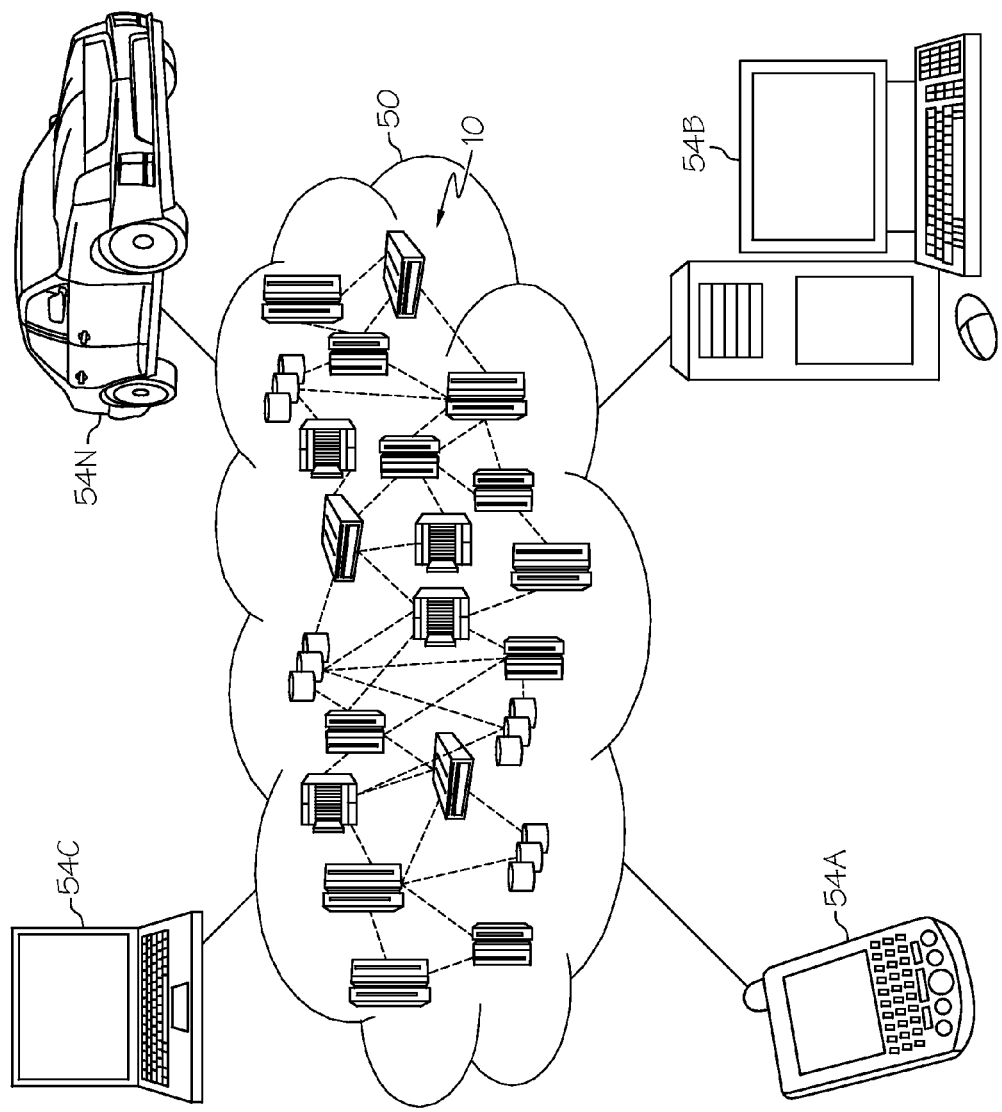
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
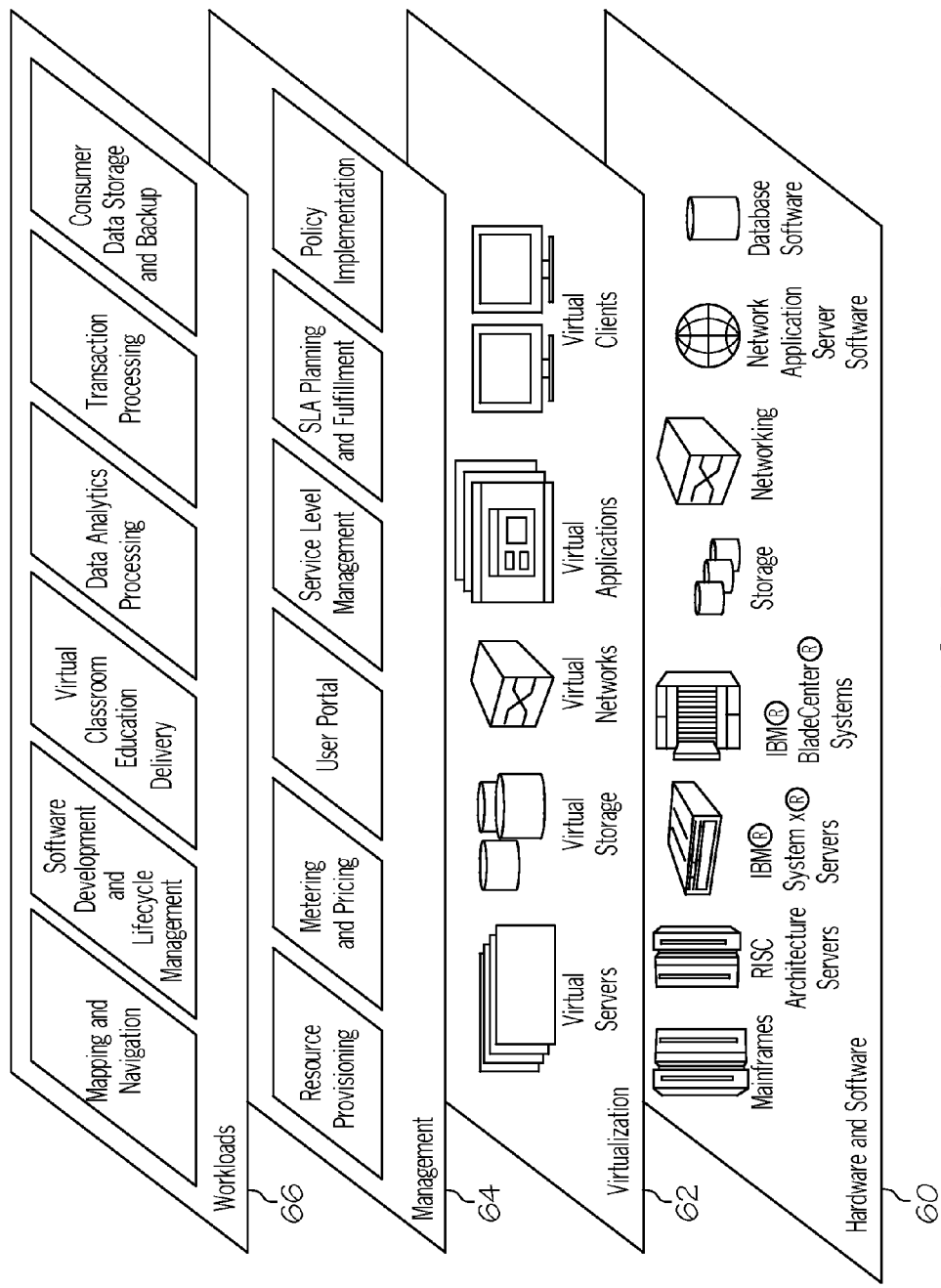
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is policy implementation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the policy implementation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
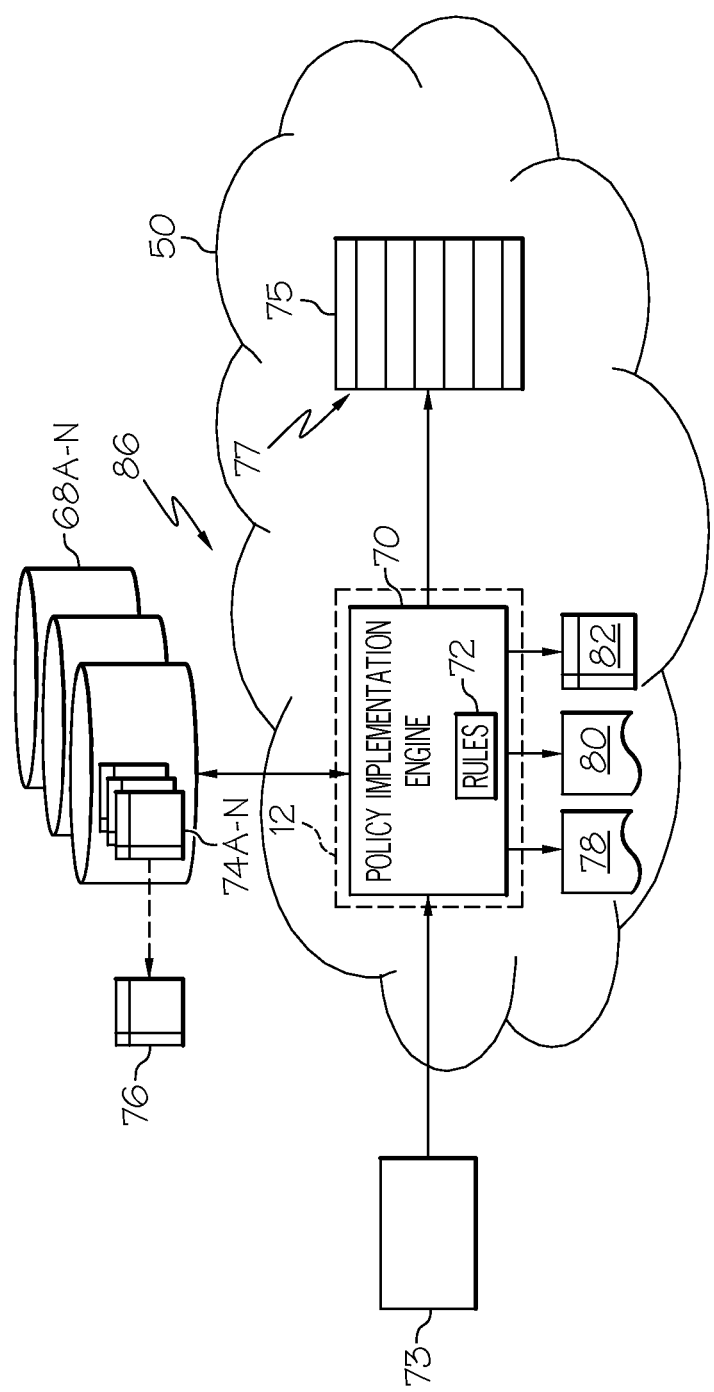
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A stand-alone computer system/server 12 is shown in FIG. 4 for illustrative purposes only. In the event the teachings recited herein are practiced in a networked computing environment 86, each client need not have a policy implementation engine (engine 70). Rather, engine 70 could be loaded on a server or server-capable device that communicates (e.g., wirelessly) with the clients to provide policy implementation therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules 78 and/or provides policy implementation hereunder.

Along these lines, engine 70 may perform multiple functions similar to a general-purpose computer. Specifically, among other functions, engine 70 may (among other things): evaluate an applicability of a policy 76 (from a set of policies 74A-N stored in computer storage device(s) 68A-N) to a set of layers 75 of a network stack 77 in networked computing environment 86 (e.g., pursuant to a request 73); determine an effectiveness of the policy 76 as applied to the set of layers 75; determine, based on the effectiveness, a plan/protocol 78 for implementing the policy 76 for at least one of the set of layers 75; compare a function of each of the set of layers 75 to an underlying purpose of the policy 76; determine, for each of the set of layers 75, whether a set of standards set forth in the policy 76 will be met if the policy 76 is applied; consolidate the policy 76 with at least one other policy of the set of policies 74A-N that is also applicable to the at least one layer; generate a rules list 80 from the policy 76 and the at least one other policy; resolve any conflicts in the rules list 80; generate, responsive to the resolving, a consolidated policy 82 from the rules list 80; prioritize parent policies of the set of policies 74A-N over child policies of the set of policies.

This system describes a method to resolve policies based on the layers of the cloud technology stack. For a given policy that is being resolved, the system first evaluates the applicability of the policy to that layer. For a given policy, the cloud system then evaluates the relative effectiveness of applying the policy to a given layer to achieve the overall goal of the policy. Based on the best fit evaluation of the relative comparison, the system then decides how and where the policy is enacted.

Figure 5:
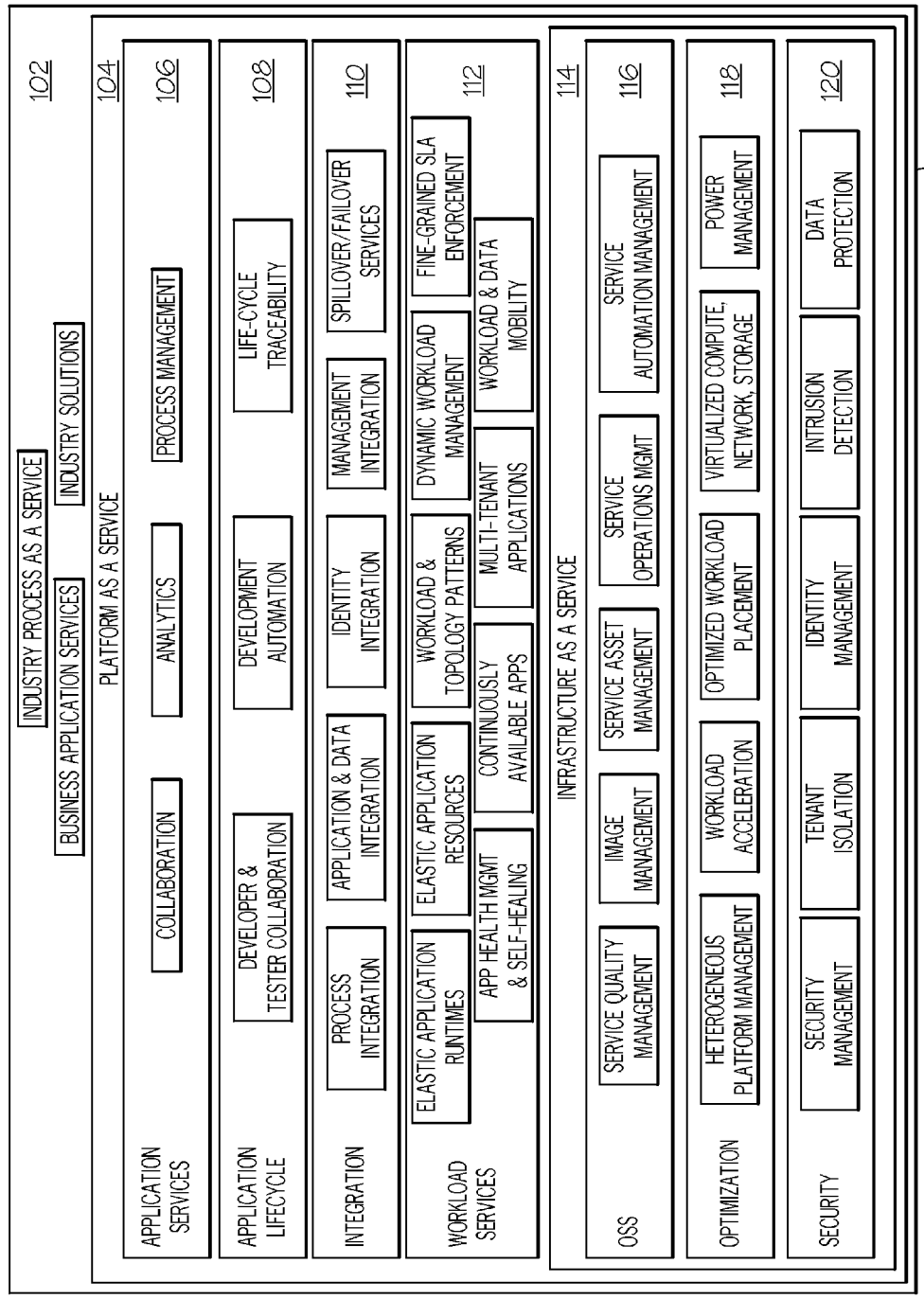
FIG. 5 depicts an illustrative cloud stack diagram according to an embodiment of the present invention.

Referring to FIG. 5, an illustrative cloud stack 100 is shown. As depicted, cloud stack 100 comprises various layers, sub-layers, and components/modules/services. For example, industrial/business processes as a service layer 102 may provide business application services and/or industry solutions. Platform as a service layer 104 may provide: applications services sub-layer 106 that provides collaboration, analytics, and/or process management; application lifecycle sub-layer 108 that provides developer and tester collaboration, development automation, and/or lifecycle traceability; integration sub-layer 110 that provides process integration, application and data integration, identity integration, management integration, and/or spillover/failover services; and/or workload services sub-layer 112 that may provide elastic application runtimes, elastic application resources, workload and topology patterns, dynamic workload management, fine-grained SLA enforcement, application health management and self-healing, continuously available applications, multi-tenant applications, and/or workload and data mobility. Infrastructure as a service layer 114 provides: operations support system (OSS) sub-layer 116 that provides service quality management, image management, service asset management, service operations management, service automation management; optimization sub-layer 118 that provides heterogeneous platform management, workload acceleration, optimized workload placement, virtualized compute, network and storage, and/or power management; and/or security sub-layer 120 that provides security management, tenant isolation, identity management, intrusion detection, and/or data protection.

Referring back to FIG. 4, it is understood that policy 76 and/or set of policies 74A-N could be provided in multiple ways. For example, policy 76 and/or set of policies 74A-N could be inherited based on: cloud level (inherited from a parent policy); user's role (e.g., developer, tester, deployment, etc.); deployed cloud group (e.g., production versus non-production); user's business unit (e.g., financial services, healthcare services, etc.); and/or attributes explicitly applied by a user.

Illustrative Example

Shown below is some illustrative computer program code according to an embodiment of the present invention:

```
Input: A given policy
Output: A list of modifications at the necessary cloud layers
resolvePolicy(Polcy p):
    for each layer I do:
        applicability[I] = calcApplicability(p, I)
    for each layer I do:
        effectiveness[I] = calcEffectiveness(p, I)
    calculateLayerModifications(p, applicability, effectiveness)
```

The following algorithm describes a method in which policies can be consolidated for a given cloud layer:

```
1.    policyList = getRelevantPolicies( )
2.    ruleList = [ ]
3.    for policy p in policyList do:
4.        for rule r in policy p do:
5.            ruleList.add(r)
6.    ruleList = consolidateCompatibleRules(ruleList)
7.    ruleList = resolveConflictingRules(ruleList)
8.    finalPolicy = generateSinglePolicy(ruleList)
```

These policies may be scoped such that parent policies take precedence, or conversely, such that child policies take precedence.

Figure 6:
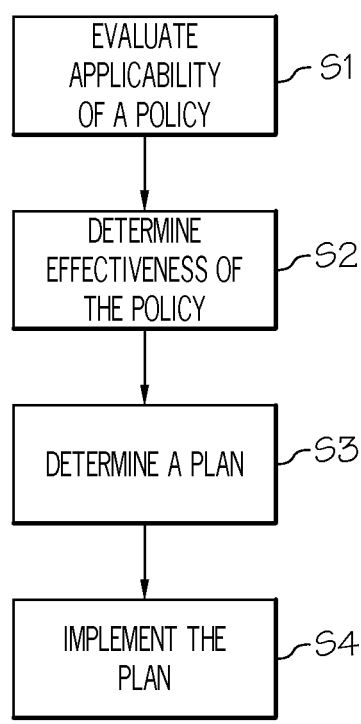
FIG. 6 depicts a method flow diagram according to an embodiment of the present invention.

Referring now to FIG. 6, a method flow diagram according to an embodiment of the present invention is shown. As depicted, in step S1, an applicability of a policy to a set of layers of a network stack in the networked computing environment is evaluated. In step S2, an effectiveness of the policy as applied to the set of layers is determined. In step S3, a protocol for implementing the policy for at least one of the set of layers is determined based on the effectiveness. In step S4, the protocol is implemented.

While shown and described herein as a policy implementation solution, it is understood that the invention further provides various alternative embodiments. For example, in one embodiment, the invention provides a computer-readable/useable medium that includes computer program code to enable a computer infrastructure to provide policy implementation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide policy implementation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for policy implementation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for implementing policies in a networked computing environment, comprising:
    evaluating an applicability of a policy to a set of layers of a network stack in the networked computing environment, the policy being drawn from a set of policies stored in at least one computer storage device, the set of layers comprising:
        a business processes as a service layer providing at least one of: business application services or industry solutions,
        a platform as a service layer comprising:
            an applications services sub-layer providing collaboration, analytics, and process management,
            an application lifecycle sub-layer providing developer and tester collaboration, development automation, and lifecycle traceability,
            an integration sub-layer providing process integration, application and data integration, identity integration, management integration, and spillover/failover services, and
            a workload services sub-layer providing elastic application runtimes, elastic application resources, workload and topology patterns, dynamic workload management, fine-drained service level agreement enforcement, application health management and self-healing, continuously available applications, multi-tenant applications, and workload and data mobility, and an infrastructure as a service layer comprising:
            an operations support system sub-layer providing service quality management, image management, service asset management, service operations management, and service automation management;
            an optimization sub-layer providing: heterogeneous platform management, workload acceleration, optimized workload placement, virtualized computation, network and storage, and power management, and
            a security sub-layer providing: security management, tenant isolation, identity management, intrusion detection, and data protection;
    determining an effectiveness of the policy as applied to the set of layers; and
    determining, based on the effectiveness, a protocol for implementing the policy for at least one layer of the set of layers.

2. The computer-implemented method of claim 1, the evaluating comprising comparing a function of each layer of the set of layers to an underlying purpose of the policy.

3. The computer-implemented method of claim 1, the determining comprising determining, for each layer of the set of layers, whether a set of standards set forth in the policy will be met if the policy is applied.

4. The computer-implemented method of claim 1, further comprising:
    generating a rules list from the policy and at least one other policy;
    resolving any conflicts in the rules list; and
    generating, responsive to the resolving, a consolidated policy from the rules list.

5. The computer-implemented method of claim 1, the determining of the protocol comprising prioritizing parent policies of the set of policies over child policies of the set of policies.

6. The computer-implemented method of claim 1, the networked computing environment comprising a cloud computing environment, and the network stack comprising a cloud computing stack.

7. The computer implemented method of claim 1, wherein a solution service provider provides a computer infrastructure operable to perform the computer-implemented method for one or more consumers.

8. A system for implementing policies in a networked computing environment, comprising:
    a memory medium comprising instructions;
    a bus coupled to the memory medium; and
    a processor coupled to the bus that when executing the instructions causes the system to:
        evaluate an applicability of a policy to a set of layers of a network stack in the networked computing environment, the policy being drawn from a set of policies stored in at least one computer storage device, the set of layers comprising:
            a business processes as a service layer providing at least one of:
        business application services or industry solutions,
            a platform as a service layer comprising:
            an applications services sub-layer providing collaboration, analytics, and process management,
            an application lifecycle sub-layer providing developer and tester collaboration, development automation, and lifecycle traceability,
            an integration sub-layer providing process integration, application and data integration, identity integration, management integration, and spillover/failover services, and a workload services sub-layer providing elastic application runtimes, elastic application resources, workload and topology patterns, dynamic workload management, fine-drained service level agreement enforcement, application health management and self-healing, continuously available applications, multi-tenant applications, and workload and data mobility, and an infrastructure as a service layer comprising an operations support system sub-layer providing: service quality management, image management, service asset management, service operations management, and service automation management;

an optimization sub-layer providing:

heterogeneous platform management, workload acceleration, optimized workload placement, virtualized computation, network and storage, and power management, and a security sub-layer providing: security management, tenant isolation, identity management, intrusion detection, and data protection;

determine an effectiveness of the policy as applied to the set of layers; and determine, based on the effectiveness, a protocol for implementing the policy for at least one layer of the set of layers.

9. The system of claim 8, the memory medium further comprising instructions for causing the system to compare a function of each layer of the set of layers to an underlying purpose of the policy.

10. The system of claim 8, the memory medium further comprising instructions for causing the system to determine, for each layer of the set of layers, whether a set of standards set forth in the policy will be met if the policy is applied.

11. The system of claim 8, the memory medium further comprising instructions for causing the system to consolidate the policy with at least one other policy of the set of policies that is also applicable to the at least one layer.

12. The system of claim 11, the memory medium further comprising instructions for causing the system to:

generate a rules list from the policy and the at least one other policy;

resolve any conflicts in the rules list; and generate, responsive to the resolving, a consolidated policy from the rules list.

13. The system of claim 8, the memory medium further comprising instructions for causing the system to prioritize parent policies of the set of policies over child policies of the set of policies.

14. The system of claim 8, the networked computing environment comprising a cloud computing environment, and the network stack comprising a cloud computing stack.

15. A computer program product for implementing policies in a networked computing environment, the computer program product comprising a computer readable hardware storage device, and program instructions stored on the computer readable storage media, to:

evaluate an applicability of a policy to a set of layers of a network stack in the networked computing environment, the policy being drawn from a set of policies stored in at least one computer storage device, the set of layers comprising:

a business processes as a service layer providing at least one of: business application services or industry solutions, a platform as a service layer comprising:

an applications services sub-layer providing collaboration, analytics, and process management, an application lifecycle sub-layer providing developer and tester collaboration, development automation, and lifecycle traceability, an integration sub-layer providing process integration, application and data integration, identity integration, management integration, and spillover/failover services, and a workload services sub-layer providing elastic application runtimes, elastic application resources, workload and topology patterns, dynamic workload management, fine-drained service level agreement enforcement, application health management and self-healing, continuously available applications, multi-tenant applications, and workload and data mobility, and an infrastructure as a service layer comprising an operations support system sub-layer providing: service quality management, image management, service asset management, service operations management, and service automation management;

an optimization sub-layer providing:

heterogeneous platform management, workload acceleration, optimized workload placement, virtualized computation, network and storage, and power management, and a security sub-layer providing: security management, tenant isolation, identity management, intrusion detection, and data protection;

determine an effectiveness of the policy as applied to the set of layers; and determine, based on the effectiveness, a protocol for implementing the policy for at least one layer of the set of layers.

16. The computer program product of claim 15, the computer readable hardware storage device further comprising instructions to compare a function of each layer of the set of layers to an underlying purpose of the policy.

17. The computer program product of claim 15, the computer readable hardware storage device further comprising instructions to determine, for each layer of the set of layers, whether a set of standards set forth in the policy will be met if the policy is applied.

18. The computer program product of claim 15, the computer readable hardware storage device further comprising instructions to consolidate the policy with at least one other policy of the set of policies that is also applicable to the at least one layer.

19. The computer program product of claim 18, the computer readable hardware storage device further comprising instructions to:

generate a rules list from the policy and the at least one other policy;

resolve any conflicts in the rules list; and generate, responsive to the resolving, a consolidated policy from the rules list.

20. The computer program product of claim 15, the computer readable hardware storage device further comprising instructions to prioritize parent policies of the set of policies over child policies of the set of policies.

* * * * *